THERMOELECTRIC FUEL ELEMENT

Filed April 10, 1961 2 Sheets-Sheet 1

INVENTORS
THOMAS H PIGFORD
JOHN B DUNLAY
BY Soans, Anderson, Luedeka & Fitch
ATTYS.

INVENTORS
THOMAS H. PIGFORD
BY JOHN B DUNLAY
Soans, Anderson, Luedeka & Fitch
ATTYS.

3,282,741

THERMOELECTRIC FUEL ELEMENT

Thomas H. Pigford, Kensington, and John B. Dunlay, Solana Beach, Calif., assignors to General Dynamics Corporation, New York, N.Y., a corporation of Delaware Filed Apr. 10, 1961, Ser. No. 101,928
4 Claims. (Cl. 136—211)

This invention relates to a thermoelectric nuclear fuel element for effecting the direct conversion of fission heat to electrical energy.

Recent advances in the design and development of thermoelectric fuel elements have revealed that numerous possibilities exist for deriving electric power directly from fission heat generated in a nuclear reactor. Various attempts at redesigning existing fuel element structures and numerous modifications of both the structural features and composition of thermoelectric fuel elements presently being utilized in nuclear reactors have been effected in an attempt to accomplish this direct conversion of fission heat to electrical energy in an efficient manner.

Fuel elements of this type develop an electromotive force (Seebeck effect) due to the interaction of fission heat with the thermoelectric materials utilized in the construction of the elements. However, these previously developed thermoelectric fuel elements, while suitable for effecting a direct conversion of fission heat to electrical energy, have required the utilization of a substantial amount of expensive thermoelectric material without producing the desired degree of energy conversion efficiency.

Accordingly, it is a prime object of the present invention to provide an improved thermoelectric fuel element.

A further object of the present invention is to provide a thermoelectric fuel element wherein a linear arrangement of fissionable and thermoelectric materials results in the direct conversion of fission heat to electrical energy in an efficient and more economical manner than heretofore realized.

Still another object of the invention resides in the provision of an efficient thermoelectric fuel element wherein the amount of thermoelectric material required to produce the desired thermal electromotive force is minimized.

Other objects and advantages of the present invention will become apparent from the following description when considered in conjunction with the accompanying drawings, wherein.

Figure 1:
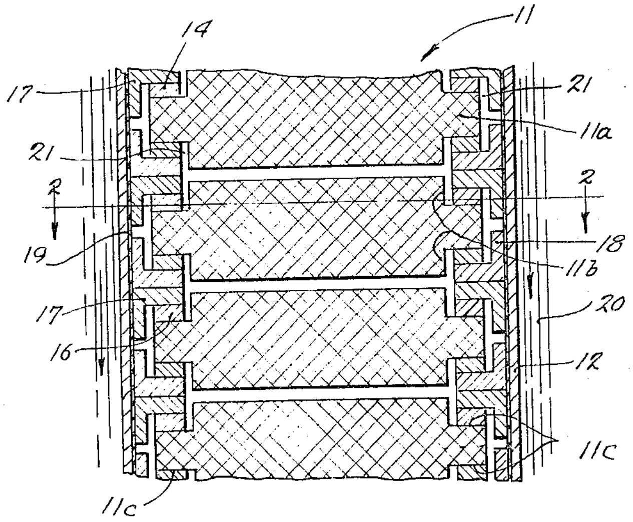
FIGURE 1 is a vertical cross-sectional view of a portion of a thermoelectric fuel element embodying the principal features of the present invention.

Referring to the drawings, there is disclosed a thermoelectric fuel element which provides a plurality of serially connected thermoelectric members that effect the direct conversion of fission heat to electrical energy, while necessitating the use of a minimum amount of thermoelectric material. The fuel element is constructed so as to provide a plurality of parallel paths for heat flow through fissionable fuel bodies. Moreover, the construction of the fuel element is such that heat flow passing from the outer surface of each of the fuel bodies to a coolant stream is concentrated at and passes through oppositely disposed peripheral edge portions of each fuel body. More particularly, this heat flow is directed through a pair of dissimilar thermoelectric elements, which are mounted in contact with these oppositely disposed peripheral edge portions of each fuel body, and through a body of cladding material over which the coolant stream is circulated. A temperature gradient established across the individual pairs of dissimilar thermoelectric elements results in the generation of a thermal electromotive force (Seebeck effect) that is proportional to this temperature gradient. The individual fuel bodies and associated thermoelectric elements that form one of a plurality of voltage generating thermoelectric units are serially connected to the other thermoelectric units mounted within the fuel element cladding. Accordingly, a cumulative thermal electromotive force of substantial magnitude is developed across oppositely disposed extremities of the fuel element.

As illustrated in FIGURE 1, one embodiment of the thermoelectric fuel element, which is generally designated by the numeral 10, includes a plurality of individual aligned fuel bodies 11 that are mounted in spaced relation within a cylindrical tube 12 that provides the fuel element cladding. Each of the disk-like fuel bodies 11, which includes a suitable fissionable material, is preferably proportioned with a generally cylindrical body **11*a* having a larger diameter than a pair of oppositely disposed cylindrical end portions 11*b* that extend therefrom along the longitudinal axis of the fuel element. The projecting end portions 11*b* define the inner edge of a pair of oppositely disposed support surfaces 11*c* that extend outwardly to the periphery of the body 11*a***.

A pair of thermoelectric elements 1 and 16, which are proportioned in the form of washers and are fabricated of n and p type semi-conductor materials respectively, are fixedly secured in thermal and electrical contact to the upper and lower support surfaces **11*c*. The inner radius of each of the washer-like thermoelectric elements is somewhat larger than the diameter of the oppositely disposed cylindrical end portions 11*b* of the fuel body 11. However, the outer diameter of each of the thermoelectric elements is substantially equal to the diameter of the cylindrical body 11*a***, as clearly illustrated in FIG. 1.

Figure 2:
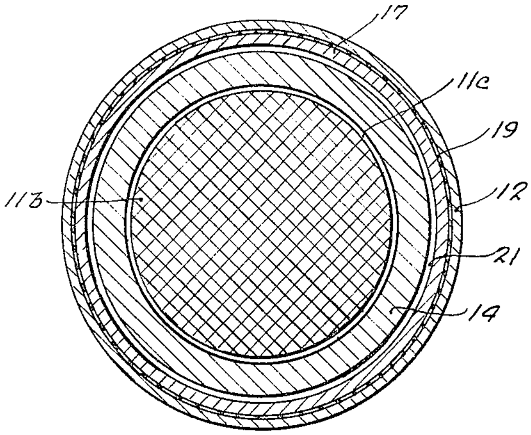
FIGURE 2 is a horizontal cross-sectional view taken along the line 2—2 of FIGURE 1.

The outwardly extending surfaces **11*c* of each of the fuel bodies serve to transmit the flow of heat produced by nuclear fission reactions, from the fuel body 11*a* through the thermoelectric elements 14 and 16, and, ultimately, to the fuel element cladding 12, through a pair of spacers 17 and 18 whereto the thermoelectric elements are electrically and thermally connected. As illustrated in FIGURES 1 and 2, the spacers 17 and 18 are cylindrical members having inwardly projecting L-shaped flange portions 17*a* and 18*a*, respectively. The flange portions 17*a* and 18*a* engage the surfaces of the thermoelectric elements 14 and 16 respectively, and are proportioned with an inner diameter that is substantially equal to the inner diameter of the individual thermoelectric elements. Accordingly, the inner edges of the thermoelectric elements and spacers are aligned with and thermally insulated from the end portions 11*b* of the fuel body 11 by spaces or voids 21**.

The outer surface of the cylindrical sections of the spacers 17 and 18 are structurally supported by and maintained in thermal contact with the fuel element cladding 12 which surrounds the entire fuel element. The spacers 17 and 18 serve to maintain the individual fuel bodies in spaced relation to each other. Although the spacers 17 and 18 are structually supported by the cladding, these members are electrically insulated therefrom and from each other by a thermally conductive coating 19 of a suitable material such as a refractory metal oxide (i.e., aluminum oxide).

Inasmuch as the spacers 17 and 18 are mounted in thermal contact with the fuel element cladding 12, across which a flow of reactor coolant 20 is maintained, the temperature of these spacers will be substantially lower than the temperature of the individual fuel bodies 11 and the peripheral support surfaces 11*c* whereto the thermoelectric elements are secured. Accordingly, while the fuel body, which is heated by nuclear fission reactions, serves as a hot junction between the two dissimilar thermoelectric elements 14 and 16, the spacers 17 and 18 serve as a cold junction for these elements. Each combination including a fuel body, pair of dissimilar thermoelectric elements and spacers constitutes what will be hereinafter referred to as a thermoelectric unit or member.

When the thermoelectric fuel element is located in an operating reactor a temperature gradient will exist between the hot junction or support surfaces 11*c* of the fuel body 11 and the cold junction or spacers 17 and 18. As a result, a thermoelectric electromotive force (Seebeck effect) will be generated across the insulated spacers. It is apparent, therefore, that the arrangement of the fuel bodies, thermoelectric elements and spacers constitutes a thermocouple; as used herein the term thermocouple defines a device for generating a thermal electromotive force as distinguished from a device used to measure temperature differences.

Figure 3:
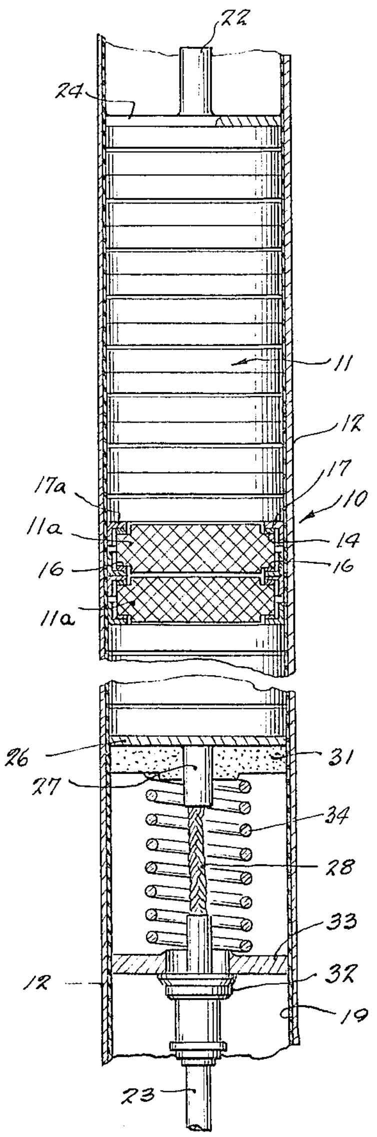
FIGURE 3 is a fragmentary perspective view, partially broken away, illustrating the general construction of the thermoelectric fuel element.
Figure 4:
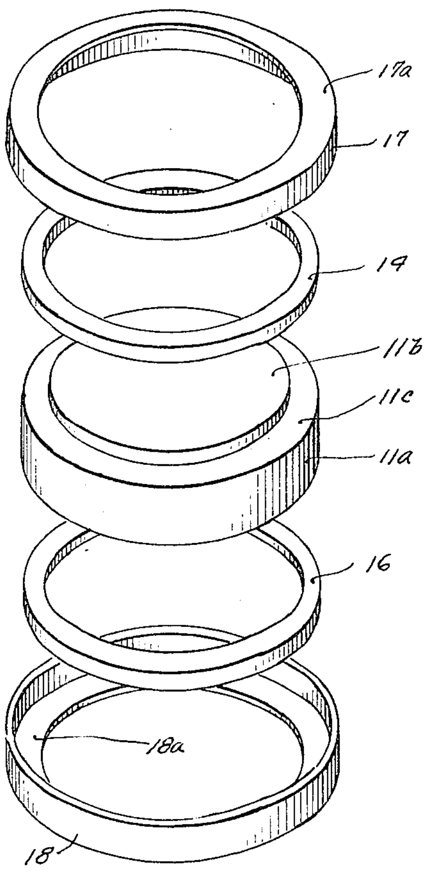
FIGURE 4 is an exploded perspective view of one of a plurality of individual thermoelectric members included in the thermoelectric fuel element illustrated in FIGURES 1–3.

As illustrated in FIGURES 1 and 3, the spacers 17 and 18 of each individual thermoelectric unit or member are aluminum soldered to adjacent spacers 18 and 17, respectively, of adjoining thermoelectric or thermocouple units thereby providing a low resistance series electrical connection therebetween. Consequently, the individual electromotive forces developed across each individual pair of spacers 17 and 18 add to effect the cumulative generation of a substantial thermoelectric voltage across the oppositely disposed extremities of the fuel element 9. This thermally generated voltage may be conveniently derived from the thermoelectric fuel element through a pair of bus bars 22 and 23 (FIGURE 3), one each of which is electrically connected to the oppositely disposed extremities of the fuel element.

More particularly, an aluminum disc 24 is aluminum soldered near the outer edge thereof to the uppermost aluminum spacer 17 that is connected to the upper n type thermoelectric element 14. Projecting from the disc 24 and electrically connected thereto is the bus bar 22 or negative output terminal for the generated thermoelectric voltage. Similarly, an aluminum disc 26 is soldered to the lowermost spacer 18 which is electrically connected to the lower p type thermoelectric element 16. Extending from and electrically connected to the disc 26 is a terminal 27 whereto a flexible connector 28 is connected. The oppositely disposed extremity of the conductor 28 is connected to the bus bar 23 or positive output terminal for the developed thermoelectric voltage.

As illustrated, the terminal 28 passes through a layer 31 of insulating material which is secured to the lower surface of the disc 26. The bus bar or positive terminal 23 is mounted within an insulator 32 that is in turn attached to an aluminum plate or disc 33 which serves as the end closure for the fuel element. The disc 33 is stationarily mounted within the tube 12, and interposed between this member and the layer 31 or insulating material is a spring 34. The spring 34 serves to allow an axial thermal expansion of the individual thermoelectric units or members during the generation of the thermoelectric voltage across the negative and positive output terminals 22 and 23.

The operation and capabilities of a thermoelectric fuel element embodying the principal features of the invention will best be understood from a consideration of the overall operation of the element and the manner in which a cumulative thermoelectric electromotive force is generated thereby.

Heat produced within the fuel element 10, and more particularly within each of the individual fuel bodies 11 flows outwardly from the main body section 11*a* toward the support surfaces 11*c* formed about the peripheral edge thereof. Accordingly, a plurality of individual parallel heat flow paths are concomitantly provided within the fuel element 10. This heat flow passes through the n and p type thermoelectric elements 14 and 16, the spacers 17 and 18, the coating of refractory metal oxide and, ultimately, through the fuel element cladding 12 to the reactor coolant stream 13 flowing adjacent to the clad surface.

The temperature gradient between the support surfaces 11*c* of each of the individual fuel bodies and the adjacent spacers which are thermally connected to the cooled fuel element cladding 12 effects the simultaneous generation of a plurality of individual thermal electromotive forces across the pairs of the thermoelectric elements 14 and 16. As previously described, the adjacent spacer members are serially connected, thereby resulting in a cumulative thermal voltage being established across the oppositely disposed output terminals 22 and 23.

The construction of the fuel element utilizing the series arrangement of electrically conductive members and parallel arrangement of thermally conductive members, and the concentration of thermoelectric material at the outer flanged surfaces of the individual fuel bodies results in a substantial reduction in the amount of thermoelectric material required to produce the desired thermal output voltage for a given temperature gradient across the elements 14 and 16.

Losses due to the passage of heat flow around the thermoelectric elements 14 and 16 are minimized inasmuch as the thermally conductive members are insulated from each other by voids or spaces 21, except at the welded or soldered junctions of the flanged fuel bodies, the elements 14 and 16 and the spacers 17 and 18. Moreover, radiation losses which might result during the conduction of heat through the fuel bodies is minimized inasmuch as a substantial portion of the surface area thereof is positioned in spaced relation to the surface of adjacent fuel bodies having approximately the same temperature.

A specific embodiment of the thermoelectric fuel element incorporating the principal features of the present invention includes approximately 35 individual thermoelectric or thermocouple units. The fuel bodies 11 of each unit can be constructed of uranium zirconium hydride, or other suitable fissionable material, and the n and p type thermoelectric elements 14 and 16 can be fabricated of lead telluride and germanium-bismuth telluride, respectively. The thermoelectric elements are joined to the aluminum spacers 17 and 18 and to the support surfaces 11*c* of the fuel bodies 11 in accordance with the procedure of forming semiconductor contacts disclosed in the co-pending application of the common assignee Serial No. 57,173 filed September 20, 1960, now abandoned. This method of joining the n and p type semiconductor elements to the spacers and fuel body insures that continuous paths for thermal and electrical energy are provided.

A thermoelectric element constructed in accordance with the provisions of the invention has an active fuel region which is approximately 14 inches in length and slightly under 1½ inches in diameter, each individual thermoelectric unit being approximately ⅖ of an inch thick. A complete thermoelectric element of the type hereinbefore described, including electrical connections, end reflectors and support adaptors is approximately 28 inches long.

From the foregoing it is apparent that a thermoelectric fuel element embodying the features of the invention provides an efficient means whereby fission heat is directly converted to thermoelectric power. Moreover, it is apparent that the present invention provides a fuel element which substantially reduces the amount of thermoelectric material necessary to produce the desired magnitude of thermoelectric power, while simultaneously effecting a substantial reduction in thermal energy losses due to radiation and the like.

It should be understood that the above described embodiment is simply illustrative of the invention. Numerous other arrangements of the structural features of the described thermoelectric fuel element may be readily devised by those skilled in the art which would embody the principles of the invention and fall within the spirit and scope thereof as set forth in the following claims.

We claim:

1. An elongated thermoelectric fuel element for effecting the direct conversion of fission heat to electrical energy, which fuel element comprises at least one fissionable fuel body having a pair of planar surfaces disposed transversely of the longitudinal axis of the fuel element, a first semiconductor element secured in thermal and electrical contact to at least a portion of one of the planar surfaces of said fuel body, a second semiconductor element secured in thermal and electrical contact to at least a portion of the other of the planar surfaces of said fuel body and having thermoelectric characteristics dissimilar to the thermoelectric characteristics of said first semiconductor element, a first support member thermally and electrically connected to said first semiconductor element, said first support member extending in a direction outwardly from the longitudinal axis of said fuel element beyond the periphery of said fuel body, a second support member thermally and electrically connected to said second semiconductor element, said second support member extending in a direction outwardly from the longitudinal axis of said fuel element beyond the periphery of said fuel body and in spaced relation to said first support member, and a housing of thermally conductive cladding material disposed in spaced relation about said fuel body and said semiconductor elements, said housing being thermally connected to the extending spaced apart support members so that a path for heat flow is provided from said fuel body to said housing and a thermal electromotive force is generated across said semiconductor elements.

2. An elongated thermoelectric fuel element for effecting the direct conversion of fission heat to electrical energy, which fuel element comprises at least one fissionable fuel body having a pair of planar surfaces disposed transversely of the longitudinal axis of the fuel element, an n-type semiconductor element secured in thermal and electrical contact to one of the planar surfaces of said fuel body adjacent the peripheral edge thereof, a p-type semiconductor element secured in thermal and electrical contact to the other of the planar surfaces of said fuel body adjacent the peripheral edge thereof, a first support member thermally and electrically connected to said n-type semiconductor element, said first support member extending in a direction outwardly from the longitudinal axis of said fuel element beyond the periphery of said fuel body, a second support member thermally and electrically connected to said p-type semiconductor element, said second support member extending in a direction outwardly from the longitudinal axis of said fuel element beyond the periphery of said fuel body and in spaced relation to said first support member, and a housing of thermally conductive cladding material disposed in spaced relation about said fuel body and said semiconductor elements, said housing being thermally connected to the extending spaced apart support members so that a path for heat flow is provided from said fuel body to said housing and a thermal electromotive force is generated across said semiconductor elements.

3. An elongated thermoelectric fuel element for effecting the direct conversion of fission heat to electrical energy in an operating reactor; which thermoelectric fuel element comprises a plurality of thermoelectric units electrically connected in series; each thermoelectric unit including a cylindrical fuel body having a pair of oppositely disposed planar surfaces serving as a hot junction for a thermocouple, a pair of dissimilar thermoelectric washers and a pair of thermally conductive members to serve as a cold junction for a thermocouple; a first of said dissimilar thermoelectric washers being secured to one planar surface of said fuel body adjacent the peripheral edge thereof; a second of said dissimilar thermoelectric washers being secured to the oppositely disposed planar surface of said fuel body adjacent the peripheral edge thereof; one of said thermally conductive members being secured to said first washer and the other of said thermally conductive members being secured to said second washer; said thermally conductive members of each thermoelectric unit being mounted in spaced relation to each other and to said fuel body, and a housing of thermally conductive material disposed about said thermoelectric units so that said thermally conductive members of each thermoelectric unit are secured in thermal contact therewith and are electrically insulated threfrom; said thermoelectric units being mounted within said housing so that said thermally conductive members of adjacent thermoelectric units establish a complete series electrical path therebetween along the length of said fuel element.

4. An elongated thermoleectric fuel element for effecting the direct conversion of fission heat to electrical energy, which fuel element comprises at least one cylindrical disk including a fissionable material and having a pair of planar surfaces disposed transversely of the longitudinal axis of the fuel element, a first ring of n-type semiconductor material having an outer diameter substantially equal to the outer diameter of said disk and concentrically secured in thermal and electrical contact to one of the planar surfaces of said disk adjacent the peripheral edge thereof, a second ring of p-type semiconductor material having an outer diameter corresponding to said first ring of semiconductor material and concentrically secured in thermal and electrical contact to the other planar surface adjacent the peripheral edge thereof, a first support member thermally and electrically connected to said first ring of semiconductor material, said first support member extending in a direction outwardly from the longitudinal axis beyond the periphery of said cylindrical disk, a second support member thermally and electrically connected to said second ring of semiconductor material, said second support member extending in a direction outwardly from the longitudinal axis beyond the periphery of said cylindrical disk in spaced relation to said first support member, and a housing of thermally conductive cladding material disposed in spaced relation about said disk of fuel material and said rings of semiconductor material, said housing being thermally connected to the extending spaced apart support members so that a path for heat flow is provided from said cylindrical disk to said housing and a thermal electromotive force is generated across said rings of semiconductor material.

References Cited by the Examiner

UNITED STATES PATENTS

| | | | |
|---|---|---|---|
| 2,811,568 | 10/1957 | Lloyd | 136—4 |
| 2,857,446 | 10/1958 | Imelmann | 136—4 |
| 2,902,423 | 9/1959 | Luebke et al. | 176—12 |
| 2,993,080 | 7/1961 | Poganski. | |

WINSTON A. DOUGLAS, *Primary Examiner.*

OSCAR R. VERTIZ, *Examiner.*

R. W. MACDONALD, A. B. CURTIS, *Assistant Examiners.*